United States Patent
Sugaki

(10) Patent No.: US 10,411,359 B2
(45) Date of Patent: Sep. 10, 2019

(54) FLIGHT INTERFERENCE APPARATUS

(71) Applicant: PRODRONE CO., LTD., Nagoya-shi, Aichi (JP)

(72) Inventor: Kiyokazu Sugaki, Nagoya (JP)

(73) Assignee: PRODRONE CO., LTD., Nagoya (JP)

(*) Notice: Subject to any disclaimer, the term of this patent is extended or adjusted under 35 U.S.C. 154(b) by 0 days.

(21) Appl. No.: 15/569,280

(22) PCT Filed: Jul. 19, 2016

(86) PCT No.: PCT/JP2016/071123
§ 371 (c)(1),
(2) Date: Oct. 25, 2017

(87) PCT Pub. No.: WO2017/018267
PCT Pub. Date: Feb. 2, 2017

(65) Prior Publication Data
US 2018/0123259 A1    May 3, 2018

(30) Foreign Application Priority Data

Jul. 27, 2015 (JP) .................................. 2015-147628

(51) Int. Cl.
*H01Q 19/17* (2006.01)
*B64C 13/20* (2006.01)
(Continued)

(52) U.S. Cl.
CPC ............. *H01Q 19/17* (2013.01); *B64C 13/20* (2013.01); *B64C 39/02* (2013.01); *H01Q 3/08* (2013.01);
(Continued)

(58) Field of Classification Search
CPC .... H04K 3/00–3/94; H04K 2203/00–2203/36; H01Q 3/00;
(Continued)

(56) References Cited

U.S. PATENT DOCUMENTS 7,394,424 B1 * 7/2008 Jelinek ................. H01Q 3/2682
    342/375
9,344,992 B2 * 5/2016 Noonan ................. H04W 48/04
(Continued)

FOREIGN PATENT DOCUMENTS

JP    2000-332890 A    11/2000
JP    2005-178558 A    7/2005

OTHER PUBLICATIONS

"Signal-Scrambling Tech Freezes Drones in Midair", E. Palermo, www.livescience.com (Year: 2015).*
Tsukamoto, Kiyoshi, "Drones; inconvenient truth Aide of the Abenomics is the Abe government with cold water, no effective means of countering terrorism," 2005,:[URL:http://biz-journal.jp/2015/05/post_9885.html] . X.
Oct. 11, 2016 International Search Report issued in International Patent Application No. PCT/JP2016/071123.

*Primary Examiner* — Raymond S Dean
(74) *Attorney, Agent, or Firm* — Oliff PLC

(57) ABSTRACT

A flight interference apparatus enabling it to block intrusion by a miniature unmanned aerial vehicle which is remotely piloted by radio communication into an area to be protected, suppress influence on communication within and outside the area, and reduce the number of required antenna devices. The flight interference apparatus includes one or a plurality of antenna devices which radiate a jamming signal from a directional antenna, and the directional antenna includes a radiating element which radiates a jamming signal of a predetermined frequency band and a reflector which gives directionality to the jamming signal in its radiation direction.

11 Claims, 4 Drawing Sheets

(51) Int. Cl.
  *B64C 39/02* (2006.01)
  *H01Q 3/08* (2006.01)
  *H04K 3/00* (2006.01)
  *H01Q 19/13* (2006.01)
(52) U.S. Cl.
  CPC ......... *H01Q 19/132* (2013.01); *H01Q 19/175* (2013.01); *H04K 3/00* (2013.01); *H04K 3/42* (2013.01); *H04K 3/43* (2013.01); *H04K 3/92* (2013.01); *B64C 39/024* (2013.01); *B64C 2201/027* (2013.01); *B64C 2201/108* (2013.01); *B64C 2201/146* (2013.01); *H04K 2203/22* (2013.01); *H04K 2203/32* (2013.01); *H04K 2203/34* (2013.01)
(58) Field of Classification Search
  CPC .......... H01Q 19/10–19/32; H01Q 3/08; B64C 13/20; B64C 39/02; B64C 39/024; B64C 2201/027; B64C 2201/108; B64C 2201/146
  See application file for complete search history.

(56) References Cited

U.S. PATENT DOCUMENTS

| | | | | |
|---|---|---|---|---|
| 9,865,921 | B2* | 1/2018 | Griffith | H01Q 5/22 |
| 9,936,442 | B1* | 4/2018 | Noonan | H04W 48/08 |
| 2002/0164946 | A1* | 11/2002 | Olsen | G01V 8/005 |
| | | | | 455/3.05 |
| 2015/0110049 | A1* | 4/2015 | Pabla | H04B 7/0697 |
| | | | | 370/329 |
| 2016/0253907 | A1* | 9/2016 | Taveira | G08G 5/006 |
| | | | | 701/3 |
| 2016/0340006 | A1* | 11/2016 | Tang | B63C 9/01 |
| 2018/0024236 | A1* | 1/2018 | Zorea | G01S 19/49 |
| | | | | 342/30 |

* cited by examiner

FLIGHT INTERFERENCE APPARATUS

TECHNICAL FIELD

The present invention relates to a flight interference apparatus and, more particularly, to a flight interference apparatus that interferes with flight of a miniature unmanned aerial vehicle which is remotely piloted by radio communication.

BACKGROUND ART

Conventionally, miniature unmanned aerial vehicles (UAVs) which are typified by unmanned helicopters for industrial use have been expensive and hard to obtain and manipulative skills have been needed to make them fly stably. Recently, however, airframe price has fallen because an acceleration sensor, angular velocity sensor, microcontroller, etc. which have high performance and are easy to handle have become available at reasonable cost, and maneuverability has improved dramatically, since many operations to control and manipulate the airframe have been automated. Because of background circumstances as above, attempts are now made to apply, especially, miniature multicopters to diverse missions in a wide range of fields, not only for hobby purposes.

A multicopter is one type of helicopter equipped with a plurality of rotors, which is a rotorcraft that flies while keeping balance of the airframe by controlling the rotating speed of each of these rotors. Since a multicopter can employ a propeller with simpler structure than that of a helicopter, the multicopter is easy to maintain and its airframe can be built at comparatively low cost.

CITATION LIST

Patent Literature

PTL1: JP 2005-178558 A
PTL2: JP 2000-332890 A

SUMMARY OF INVENTION

Technical Problem

On the other hand, as multicopters have become easily usable, there arises an urgent need for countermeasures against abuse of multicopters, such as making a multicopter intrude into a private property or a no-trespassing area by piloting it to fly over a defensive barrier such as a wall or a fence from above or secrete photographing or videoing from above using a multicopter.

To counteract such a suspicious multicopter, it is considered as effective to interfere with radio communication by which a multicopter is piloted and disable the piloting of the multicopter. Among multicopters now in the marketplace, especially, most of multicopters which are commonly available and which can be equipped with a video camera within specification are equipped with a homing function that causes a multicopter to automatically home to a takeoff point when communication with its operator has been interrupted during flight. Therefore, by radiating a jamming signal toward an intruding multicopter and actuating the above homing function, it is thought to be possible to drive back the multicopter to the operator.

In PTL1 mentioned above, a configuration is disclosed in which a remotely piloted helicopter is piloted by a main transmitter of a main operator and a sub-transmitter of a co-operator and the helicopter is caused to transit into a hovering state by sending a jamming signal to the helicopter from the sub-transmitter of the co-operator. Also, in PTL2 mentioned above, there is disclosed an apparatus for hampering signal arrival on a cellular phone to put a cellular phone in a call-disabled state by sending an interference radio signal depending on a frequency band of the cellular phone (cellular mobile telephone system).

If the method of PTL1 is used, it is necessary to always watch for access of a suspicious multicopter visually and this method is not realistic when an area to be protected is broad. Also, in a case where intrusion by a multicopter is to be blocked by a jamming signal, cautions must be taken so that the jamming signal will not have influence on communication in an area to be protected and unrelated communication outside the area, but no measures for suppressing such influence are mentioned in PTL1.

To suppress the influence of a jamming signal on unrelated communication within and outside the area to be protected, it is considered as necessary to make jamming signals directional in a radiation direction and radiate the jamming signals to form a barrier to close only intrusion paths that a multicopter may enter the area to be protected. On the other hand, there is a problem in which, for making jamming signals directional, a lot of antenna devices are needed to protect a broad area as mentioned above.

The apparatus for hampering signal arrival on a cellular phone in PTL2 is intended to hamper signal arrival on a cellular phone or the like within an entire predetermined area, as described in the sections of problem and advantageous effect, and differs from the present invention in a problem to be solved and technical idea. In PTL2, there is a description that interference radio signals are made directional, but concrete means for giving directionality to the signals is not set forth. Also, directional antennas in PTL2 are considered to be used only in the edges of an area experiencing interference by non-directional antennas and are not intended to form a barrier of jamming signals only with directional antennas, as in the present invention; so, the problem in which a lot of antennas are needed does not exist.

In consideration of the foregoing problems, a problem to be solved by the present invention is to provide a flight interference apparatus enabling it to block intrusion by a miniature unmanned aerial vehicle which is remotely piloted by radio communication into an area to be protected, suppress influence on communication within and outside the area, and reduce the number of required antenna devices.

Solution to Problem

To solve the above-noted problem, a flight interference apparatus of the present invention is a flight interference apparatus that interferes with flight of a miniature unmanned aerial vehicle which is remotely piloted by radio communication, wherein the flight interference apparatus includes one or a plurality of antenna devices which radiate a jamming signal from a directional antenna, and the directional antenna includes a radiating element which radiates a jamming signal of a predetermined frequency band and a reflector which gives directionality to the jamming signal in its radiation direction.

By radiating a jamming signal from a directional antenna, an extent of influence of a jamming signal can be localized and it becomes possible to control the extent of influence. Thereby, it is possible to prevent unintentionally interfering with unrelated communication other than communication with a suspicious miniature unmanned aerial vehicle.

In addition, the directional antenna may be configured to be capable of making a reciprocating motion continuously in a predetermined angle range of its elevation angle or azimuth angle.

By reciprocating the directional antenna in a predetermined angle range, it is possible to expand a range in which one antenna device can radiate jamming signals. Thereby, it becomes possible to reduce the number of required antenna devices even in a case where an area to be protected is broad.

Additionally, the directional antenna may be configured such that it includes a plurality of the radiating elements for the one reflector, and the plurality of the radiating elements radiate jamming signals of different frequency bands respectively.

By allowing for radiation of jamming signals of plural frequency bands from one antenna device, it is possible to expand a range in which multicopter flight can be counteracted without increasing the number of antenna devices.

In addition, the directional antenna may be configured to be a parabola antenna in which the radiating element serves as a primary radiator and the reflector has a concave curved surface.

Because a parabola antenna has higher gain among directional antennas and its side lobe is small, it becomes possible to further reduce influence on unrelated communication other than communication with a suspicious miniature unmanned aerial vehicle.

In addition, another configuration may be such that each of the antenna devices is deployed close to the boundaries of a geographical area or space where intrusion by the miniature unmanned aerial vehicle should be blocked, and for the directional antenna of each of the antenna devices, its elevation angle and azimuth angle are set to an angle so that the jamming signals will radiate toward intrusion paths into the geographical area or space and the jamming signals will have less influence on the geographical area or space.

By deploying antenna devices so that a main lobe of jamming signals will radiate toward intrusion paths into an area to be protected (a geographical area or space where intrusion by a miniature unmanned aerial vehicle should be blocked), while diminishing the extent of a side lobe of jamming signals into the area to be protected, it is possible to achieve both blocking intrusion by a miniature unmanned aerial vehicle and preserving communication within the area to be protected.

In addition, another configuration may be such that the directional antenna of each of the antenna devices makes a reciprocating motion in the predetermined angle range, thereby scanning over all the intrusion paths into the geographical area or space with the jamming signals.

By reciprocating the directional antenna in a predetermined angle range, it is possible to expand a range in which one antenna device can radiate jamming signals. Thereby, even in a case where an area to be protected is broad, it becomes possible to cover all the intrusion paths into the area with jamming signals, while reducing the number of required antenna devices.

In addition, another configuration may be such that the miniature unmanned aerial vehicle is a multicopter, and each of the antenna devices radiates a 2.4 GHz band jamming signal.

Multicopters now in the marketplace are generally piloted by radio communication of a 2.4 GHz band. Therefore, it is conceivable that radiating a 2.4 GHz band jamming signal toward a suspicious multicopter from an antenna device can make most of multicopters uncontrollable.

Advantageous Effects of Invention

As described above, according to a flight interference apparatus pertaining to the present invention, it is possible to block intrusion by a miniature unmanned aerial vehicle which is remotely piloted by radio communication into an area to be protected, suppress influence on communication within and outside the area, and reduce the number of required antenna devices.

DESCRIPTION OF EMBODIMENTS

In the following, one embodiment of a flight interference apparatus pertaining to the present invention will be described with the aid of the drawings.

Figure 1A:
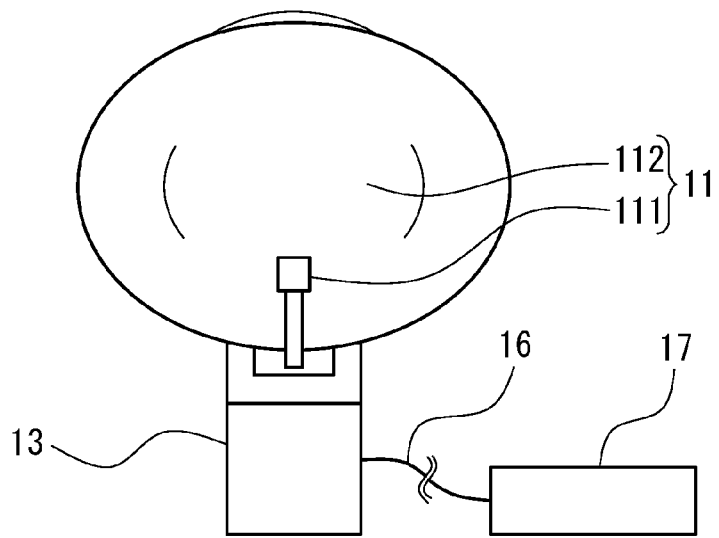
FIGS. 1A to 1C are schematic diagrams depicting an external appearance of an antenna device which is a component of a flight interference apparatus pertaining to an embodiment.
Figure 1B:
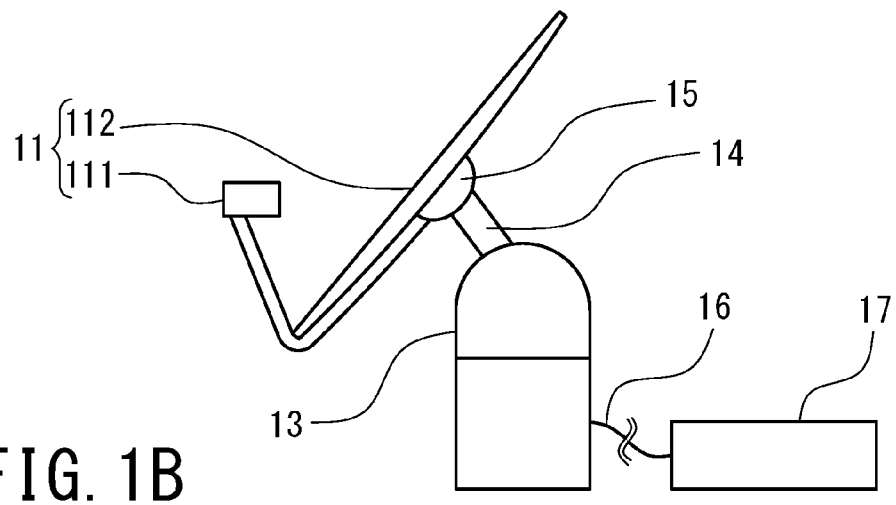
Figure 1C:
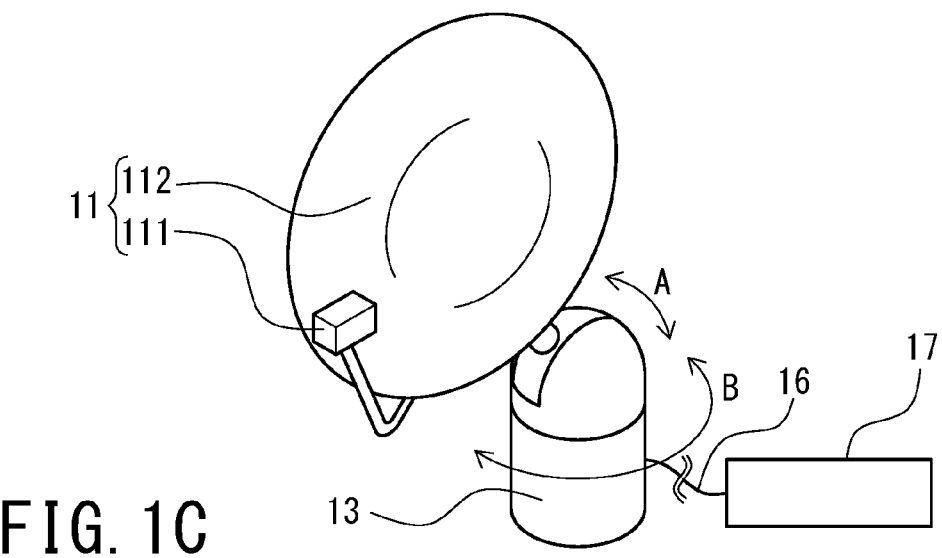

FIGS. 1A to 1C are a set of a front view (FIG. 1A), a side view (FIG. 1B), and a perspective view (FIG. 1C) depicting an external appearance of an antenna device 10 which is a component of a flight interference apparatus 90 pertaining to the present embodiment. The antenna device 10 is a device that radiates a 2.4 GHz band jamming signal (hereinafter simply referred to as a "jamming signal") which is a signal modulated with noise, the signal being used by a multicopter for communication. Now, a "multicopter" that is mentioned in the present invention refers to a multicopter as a miniature unmanned aerial vehicle (UAV). Because multicopters now in the marketplace are generally piloted by radio communication of a 2.4 GHz band, it is conceivable that interfering with the 2.4 GHz band communication can make most of multicopters uncontrollable.

The antenna device 10 is provided with a parabola antenna 11 which is a directional antenna. The parabola antenna 11 includes a primary radiator 111 (radiating element) and a reflecting mirror 112 (reflector) formed of a concave curved surface that gives directionality to a jamming signal in its radiation direction.

The parabola antenna 11 is coupled to a rotating platform 13 via an adjuster 15 and an arm 14. The rotating platform 13 is a unit that controls the orientation and angle of the arm 14 by drive force of a motor. The antenna device 10 has the rotating platform 13, thereby enabling it to remotely control an elevation angle A and an azimuth angle B of the parabola antenna 11. Also, the adjuster 15 is placed between the arm 14 and the parabola antenna 11, and the orientation and angle of the parabola antenna 11 can also be adjusted by the adjuster 15. This makes it possible to orient the parabola antenna 11 at an angle, which is difficult only with the rotating platform 13 and the arm 14, and to make a flexible adjustment of a radiation angle of the parabola antenna 11.

The rotating platform 13 is fixed to an antenna mast which is not depicted or a wall surface or the like with fixing brackets. For a mechanism of the rotating platform 13, a publicly known motor drive mechanism such as, e.g., a drive mechanism of vertical indirect type robot arms can be used. In addition, in the present invention, an "elevation angle" refers to orientation of the parabola antenna 11 in a vertical direction with respect to the plane on which the rotating platform 13 is installed and an "azimuth angle" refers to orientation of the parabola antenna 11 in a horizontal direction with respect to the plane on which the rotating platform 13 is installed.

The parabola antenna 11 and the rotating platform 13 are connected to a control device 17 through a control cable 16 including a coaxial cable or the like. The control device 17 is a device that performs, inter alia, supplying a high-frequency current to the parabola antenna 11 and sending a control signal to the rotating platform 13. The control device 17 may be connected to a host management device, not depicted, which integrally manages the operations of a plurality of control devices 17.

Figure 2A:
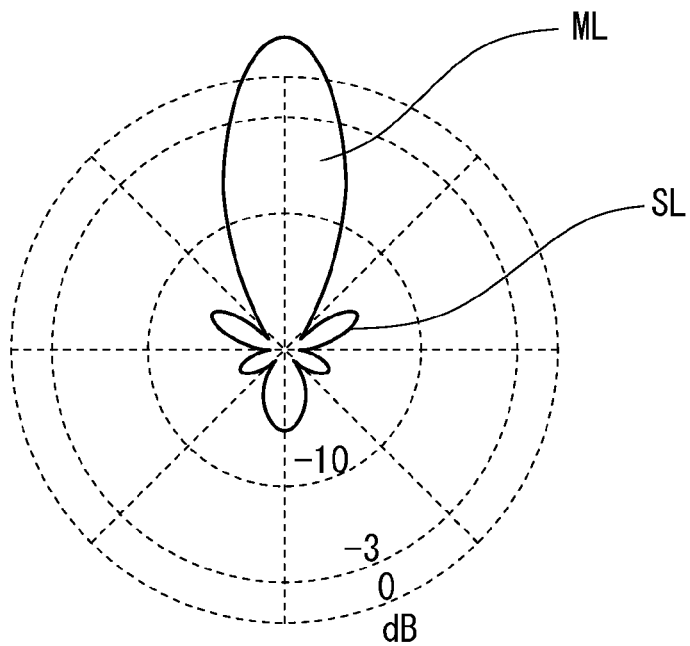
FIGS. 2A and 2B are diagrams depicting directionality of the antenna device.

FIG. 2A is a diagram depicting directionality of the antenna device 10.

The antenna device 10 has directionality in horizontal plane and directionality in vertical plane, both of which are of a substantially identical form. Because the antenna device 10 gives directionality with the parabola antenna 11, gain of a main lobe ML of the antenna device 10 is comparatively high among directional antennas and leakage of its side lobe SL is small. Thereby, an extent of influence of a jamming signal can be localized and it is possible to control the extent of influence. That is, it is possible to reduce influence on unrelated communication other than a signal for communication with a multicopter.

The antenna device 10 is capable of making the elevation angle or the azimuth angle of the parabola antenna 11 shift continuously in a reciprocating fashion within a predetermined angle range by the rotating platform 13. By reciprocating the parabola antenna 11 over a predetermined angle range, it is possible to expand a range in which one antenna device 10 can radiate jamming signals. Thereby, it is possible to reduce the number of required antenna devices 10 even in a case where an area to be protected is broad.

Figure 2B:
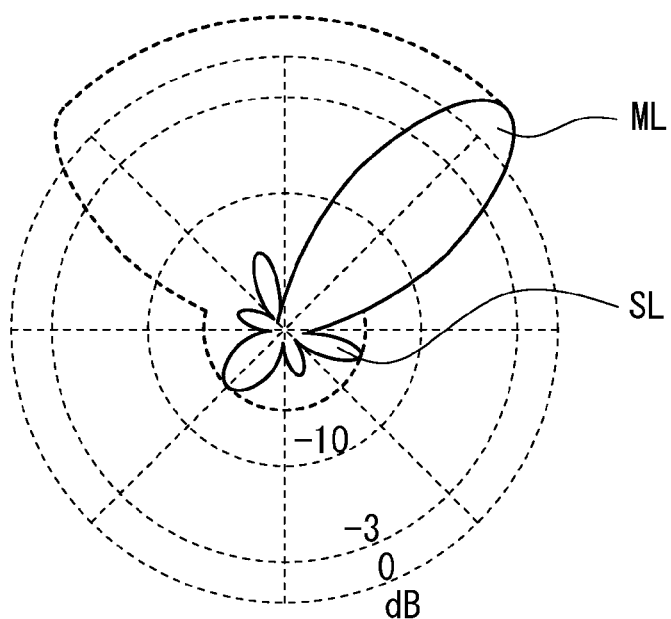

FIG. 2B is a diagram depicting a jamming signal scan range by a reciprocating motion of the parabola antenna 11. As described above, the reciprocating motion of the parabola antenna 11 may be performed both when shifting the elevation angle and when shifting the azimuth angle. While the parabola antenna 11 in FIG. 2B makes a reciprocating motion within a range of 90 degrees, the angle range can be changed to a suitable range, as appropriate, depending on the position and orientation in which the rotating platform 13 is installed, the size of a facility 95 to be protected (a geographical area or space where intrusion by a miniature unmanned aerial vehicle should be blocked) which will be described later, and the number of deployable antenna devices 10, among others.

Figure 3A:
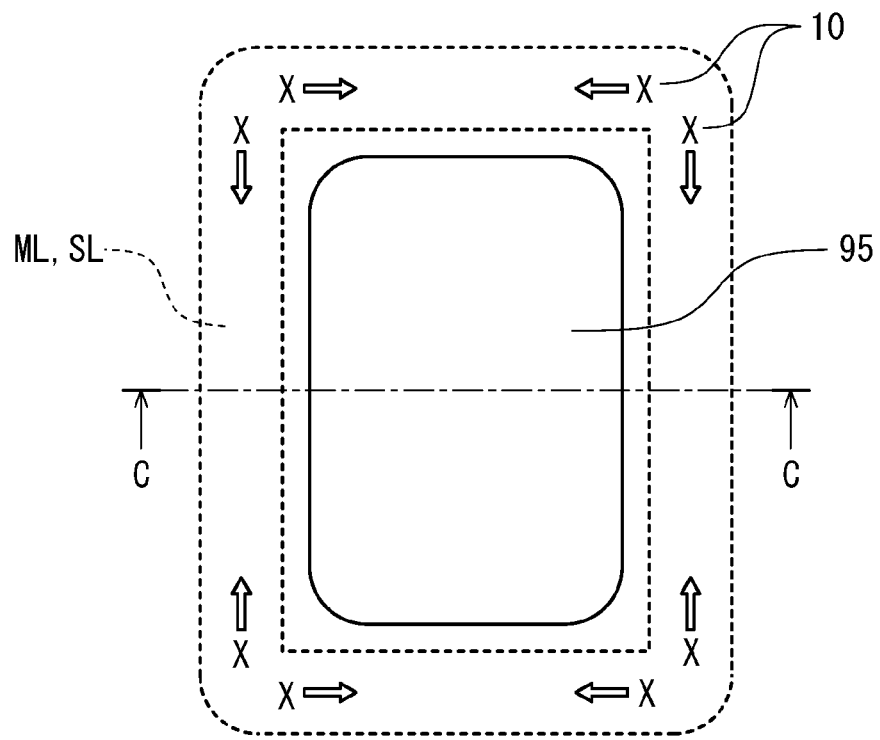
FIGS. 3A and 3B are diagrams depicting one example of how jamming signals are radiated by antenna devices.
Figure 3B:
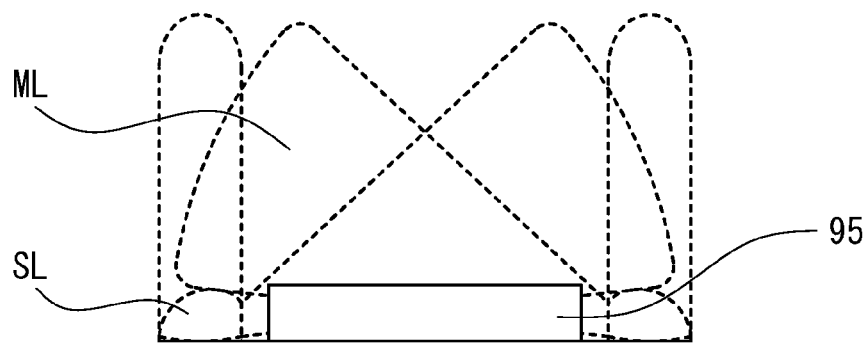

FIGS. 3A and 3B are diagrams depicting one example of how jamming signals are radiated by antenna devices 10. A rectangle with round corners depicted in the center of FIG. 3A represents a facility 95 to be protected. Marking X marked close to a dotted line zone surrounding the facility 95 to be protected, i.e., the boundaries of the facility 95 to be protected, represents an antenna device 10, and an arrow accompanying marking X indicates a radiation direction of the main lob ML by the antenna device 10. FIG. 3B is a cross-sectional diagram when the facility 95 to be protected and a jamming signal model in FIG. 3A are viewed from a C-C direction.

A plurality of antenna devices 10 are deployed around the facility 95 to be protected, and the elevation and azimuth angles of the parabola antenna 11 of each antenna device 10 are set to an angle so that jamming signals will radiate toward intrusion paths that a multicopter may enter the facility 95 to be protected (in the case of the facility 95 to be protected, airborne paths above its entire circumference) and the jamming signals will have less influence on the facility 95 to be protected.

In particular, as depicted in FIG. 3B, each antenna device 10 is deployed at some point distant from the facility 95 to be protected enough to prevent its side lobe SL from arriving at the facility 95 to be protected. Jamming signals from each antenna device 10 are set to radiate in parallel with surrounding walls of the facility 95 to be protected and to reciprocate continuously between a radiation angle which is substantially parallel with the ground and a radiation angle tilted upward from it by approximately 30 degrees. Thereby, it is possible to provide for preservation of unrelated communication within the facility 95 to be protected and outside the facility 95 to be protected and to scan over all possible intrusion paths that a multicopter may enter the facility 95 to be protected with jamming signals, while reducing the number of deployed antenna devices 10.

(Another Embodiment)

A flight interference apparatus 90b pertaining to another embodiment of the present invention is described below with a drawing. Now, in the following description, a component having a similar or the same function as in the foregoing embodiment is assigned the same reference designator as in the foregoing embodiment and its detailed description is omitted.

Figure 4:
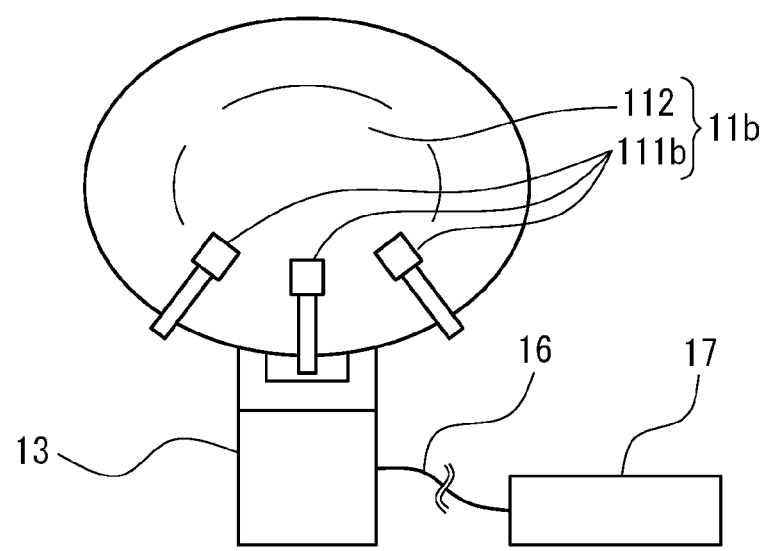
FIG. 4 is a front view depicting an external appearance of an antenna device which is a component of a flight interference apparatus pertaining to another embodiment.

FIG. 4 is a front view depicting an external appearance of an antenna device 10b which is a component of the flight interference apparatus 90b pertaining to another embodiment. The antenna device 10b is provided with a parabola antenna 11 that is a directional antenna. The parabola antenna 11 includes a plurality of primary radiators 111b (radiating elements) and a reflecting mirror 112 (reflector) formed of a concave curved surface that gives directionality to a jamming signal in its radiation direction.

The plurality of primary radiators 111b radiate jamming signals, modulated with noise for a multicopter, with different frequencies respectively in a 2.4 GHz band and other frequency bands. By allowing for radiation of jamming signals of plural frequency bands from one antenna device 10b, it is possible to expand a range in which multicopter flight can be counteracted without increasing the number of antenna devices 10b.

While embodiments of the present invention have been described hereinbefore, the present invention is not limited to the foregoing embodiments and can be modified in various ways without departing from the gist of the present invention.

For example, although a parabola antenna is used as a directional antenna in the embodiments described herein, other directional antennas such as a Yagi antenna and a planar antenna can be used.

INDUSTRIAL APPLICABILITY

The present invention is useful as countermeasures against a suspicious unmanned aerial vehicle which is remotely piloted by radio communication, such as trespassing of a multicopter.

The invention claimed is:

1. A flight interference apparatus that interferes with flight of a miniature unmanned aerial vehicle which is remotely piloted by radio communication, the flight interference apparatus comprising:
   at least one antenna device configured to radiate a jamming signal from a directional antenna, and being provided within or on a periphery of a protected area,
   the directional antenna includes: (i) a plurality of radiating elements configured to radiate a jamming signal of a predetermined frequency band, and (ii) a reflector which provides directionality to the jamming signal in a radiation direction, and
   the plurality of the radiating elements radiate jamming signals of different frequency bands respectively to physically block or prevent the unmanned aerial vehicle from entering the protected area having the at least one antenna device.

2. A flight interference apparatus that interferes with flight of a miniature unmanned aerial vehicle which is remotely piloted by radio communication, the flight interference apparatus comprising:
   at least one antenna device configured to radiate a jamming signal from a directional antenna,
   the directional antenna includes: (i) a radiating element configured to radiate a jamming signal of a predetermined frequency band, and (ii) a reflector which provides directionality to the jamming signal in a radiation direction,
   the at least one antenna device is provided within or on a periphery of a protected geographical area or space where physical intrusion by the miniature unmanned aerial vehicle is blocked, and
   an elevation angle and azimuth angle of the directional antenna of the at least one antenna device is set to an angle so that the jamming signals radiate toward intrusion paths into the protected geographical area or space to physically block or prevent the unmanned aerial vehicle from entering the protected geographical area or space having the at least one antenna device.

3. The flight interference apparatus according to claim 1, wherein the directional antenna performs a reciprocating motion continuously in a predetermined angle range of an elevation angle or azimuth angle of the directional antenna.

4. The flight interference apparatus according to claim 2, wherein the directional antenna performs a reciprocating motion continuously in a predetermined angle range of the elevation angle or azimuth angle of the directional antenna.

5. The flight interference apparatus according to claim 1, wherein the directional antenna is a parabola antenna in which the radiating element is configured as a primary radiator and the reflector has a concave curved surface.

6. The flight interference apparatus according to claim 2, wherein the directional antenna is a parabola antenna in which the radiating element is configured as a primary radiator and the reflector has a concave curved surface.

7. The flight interference apparatus according to claim 4, wherein
   the directional antenna of the at least one antenna device performs the reciprocating motion in the predetermined angle range, thereby scanning over intrusion paths into the protected geographical area or space with the jamming signals.

8. The flight interference apparatus according to claim 1, wherein
   the miniature unmanned aerial vehicle is a multicopter, and
   the at least one antenna device radiates a 2.4 GHz band jamming signal.

9. The flight interference apparatus according to claim 2, wherein
   the miniature unmanned aerial vehicle is a multicopter, and
   the at least one antenna device radiates a 2.4 GHz band jamming signal.

10. The flight interference apparatus according to claim 1, wherein
    the at least one antenna device includes at least two primary radiators, and
    the at least two primary radiators are configured to radiate jamming signals simultaneously.

11. The flight interference apparatus according to claim 2, wherein
    the at least one antenna device includes at least two primary radiators, and
    the at least two primary radiators are configured to radiate jamming signals simultaneously.

* * * * *